United States Patent [19]
Fraser

[11] Patent Number: 5,664,115
[45] Date of Patent: Sep. 2, 1997

[54] INTERACTIVE COMPUTER SYSTEM TO MATCH BUYERS AND SELLERS OF REAL ESTATE, BUSINESSES AND OTHER PROPERTY USING THE INTERNET

[76] Inventor: Richard Fraser, 10 Glen Avon Dr., Riverside, Conn. 06878

[21] Appl. No.: 477,641

[22] Filed: Jun. 7, 1995

[51] Int. Cl.⁶ .................................................. G06F 17/60
[52] U.S. Cl. .................................................. 705/37
[58] Field of Search ........................ 364/401 R, 403, 364/408; 395/226, 227, 237, 228

[56] References Cited

U.S. PATENT DOCUMENTS

| | | | |
|---|---|---|---|
| 3,573,747 | 4/1971 | Adams et al. | 364/408 |
| 4,635,136 | 1/1987 | Ciampa et al. | 386/64 |
| 5,032,989 | 7/1991 | Tornetta | 395/226 |
| 5,191,410 | 3/1993 | McCalley et al. | |
| 5,235,680 | 8/1993 | Bijnagte | |
| 5,283,731 | 2/1994 | Lalonde et al. | 364/401 R |
| 5,309,355 | 5/1994 | Lockwood | 364/401 R |
| 5,500,793 | 3/1996 | Deming, Jr. et al. | 395/237 |

OTHER PUBLICATIONS

Harley Hahn et al., "The Internet Yellow Pages", Second Edition, (1995), pp. 75–77, 80–82, 86–87, 564.
"Global Real Estate Guide", Nat'l. Assoc. of Realtors, 1994 Annual Trade Exposition, Internet Printout 8 pp.
Guy Gugliotta, "Capitol Notebook, Citizen Burned Offering SBA a Hot Idea," The Washington Post, Apr. 19, 1995.
Ellis Booker, "Financial Services Spread Across Web," Computerworld, May 15, 1995, p. 12.
Computer Printout, INSPEC/WPAT Database Listing of Computerized Real Estate, 3 pp.
Computer Printout, Internet Database listing of Businesses, 7 pp.

*Primary Examiner*—Donald E. McElheny, Jr.
*Attorney, Agent, or Firm*—Dale Curtis Hogue, Sr.; Kilpatrick Stockton LLP

[57] ABSTRACT

A method and apparatus of automatically matching sellers of property with potential buyers through a communications network (preferably the Internet) in which a host system communicates with the sellers and the potential buyers over telephone or dedicated data transmission lines. The host system obtains and stores a first set of records each corresponding to a property to be sold. The first set of records can then be search by a remote data terminal associated with a potential buyer. The results of this search are then provided to the potential buyer, who indicates specific property listings that the potential buyer may be interested in purchasing. The potential buyer provides identifying information which is then provided to the sellers of the indicated property. Provisions are made to ensure that the sellers who list property support the system. Further, the system permits automatic evaluation of potential buyers to screen buyers whose information does not match minimum criteria provided by the seller.

8 Claims, 12 Drawing Sheets

FIG. 4A

| SELLER ID | NAME | ADDRESS | TELEPHONE NUMBER | LISTED PROPERTY ITEMS | ACCESS STATUS |
|---|---|---|---|---|---|
| | | | | | |

FIG. 4B

| BUYER ID | NAME | ADDRESS | TELEPHONE NUMBER | QUALIFICATION INFO. | REQUESTED PROPERTY ITEMS |
|---|---|---|---|---|---|
| | | | | | |

FIG. 4C

| PROPERTY ID | TYPE | COST | OTHER FEATURES | SELLER | REQUESTING BUYERS |
|---|---|---|---|---|---|
| | | | | | | to FIG. 5B

INTERACTIVE COMPUTER SYSTEM TO MATCH BUYERS AND SELLERS OF REAL ESTATE, BUSINESSES AND OTHER PROPERTY USING THE INTERNET

FIELD OF THE INVENTION

This invention relates to a system and method of matching buyers and sellers of real estate, businesses and other tangible and intangible assets. In particular, it relates to a system and method of matching buyers and sellers over a network based on buyer selection and screening criteria.

BACKGROUND OF THE INVENTION

Several methods are known to match buyers with sellers of various types of property. On a basic level, an individual buyer might identify a piece of property that is being offered for sale through advertisement or word of mouth, and then directly contact the seller or the seller's agent. Once contact is made, negotiations take place which may result in a consummated sales transaction.

Particularly for large scale transactions, the process usually is more complicated. Instead of searching item by item to find a desired piece of property, a buyer may wish to narrow the universe of potential property according to certain criteria such as price, size or location. This permits the buyer to avoid spending time looking at property or listings which are of only tangential interest or no interest at all, and instead to focus on the universe of property which most suits the buyer's needs.

From the seller's perspective, it is desirable to narrow contacts with potential buyers to those more likely to result in a consummated transaction. Perhaps most importantly, it is in the seller's interest to evaluate the financial position of prospective buyers to minimize financial risk and to avoid added time and expense.

Frequently, the seller desires to preserve anonymity throughout part or all of the sales process. Further, it is often desired by the seller to obtain a list of potential buyers who can each be evaluated in terms of the likelihood that they will purchase the seller's property before they are contacted.

In recent times, advances in data storage and retrieval methods and communications methods have permitted more sophisticated approaches to performing at least the initial step of matching buyers and sellers. For example, many real estate agents now utilize a network of terminals linked to a host computer which provides a database of listed properties. The agent can formulate a list of properties in which the buyer may be interested based on criteria provided by the buyer, such as price, location, size or type. The buyer can then view the property and, if interested, can contact the seller, or more usually, the seller's agent in order to initiate negotiations.

Advances in communications and multimedia applications have been applied to improve the quality of the information conveyed to the potential buyer about property being offered for sale. For instance, U.S. Pat. No. 5,235,680 describes a system and method in which textual and image information are transmitted between a host and several remote display terminals. In this way, images of the property being offered can be conveyed in real time to the buyer.

A related prior art method of linking potential buyers with sellers involves "home shopping," typically using television and voice communication. For example, for several years advertisers have displayed individual items through television broadcasts to permit buyers to purchase such items over the telephone. More recently, interactive systems have been proposed through which the prospective buyer can order merchandise advertised via data transmission over telephone lines, thereby eliminating the need to speak with a salesperson. The system described in U.S. Pat. No. 5,191,410 is illustrative of such a prior art approach.

Even more recently, the global network commonly referred to as the "Internet" has been used to advertise particular pieces of property to potential buyers. Such uses are primarily limited to situations in which a seller advertises a particular piece of property by posting a listing on an "electronic bulletin board" which may be read by potential buyers. The buyers can then contact the seller or the seller's agent by telephone or by electronic mail.

While some databases created by agents or brokers are available, access is usually limited. Typically, many systems require the payment of a fee in order to gain authority to utilize the database. Many others available on the Internet are limited in terms of the features and services provided.

While greatly improving the accessibility of buyers to information concerning property being offered for sale, these prior art methods and systems suffer from many disadvantages and drawbacks. For example, most of the prior art approaches described above are limited in geographic scope. Thus, the time and expense incurred by a potential buyer interested in purchasing property in a distant area is dramatically increased. Further, where networks are accessible to a larger geographic area, they typically require a subscriber fee to gain access, thereby resulting in added expense to the buyer, and thus providing a disincentive to at least those buyers not located close to the seller.

Moreover, many of the systems according to the prior art fail to perform more than an item-by-item listing of pieces of property being offered for sale. A buyer must therefore expend a great deal of time and effort to sort through each item to find one which is of potential interest. Even where the prior art provides a sorting function, such as with the real estate databases, they generally are not directly available to the buyer, but instead must be accessed through an agent. Again, this adds to the buyer's costs, and provides a disincentive to purchase, thus adversely impacting the seller.

Furthermore, the prior art systems described above often fail to adequately screen potential buyers. As mentioned above, financial screening permits the seller to increase the chances of a successful consummated sale. While a buyer may seek financial evaluation before initiating a search, it often occurs that a buyer seeks to look at property being offered without performing such an evaluation. Further, while financial screening can be performed by the seller or the seller's agent, it usually takes place after contact with the buyer has been made. Thus, both parties may waste time making contact in a situation where the chances of a consummated sale are unlikely.

SUMMARY OF THE INVENTION

It is an object of the invention to overcome the aforementioned limitations of the prior art. It is another object of the invention to provide ready access over a data terminal, such as a personal computer, to listings of real estate, businesses, or other property being offered for sale.

In particular, it is an object of the invention to provide a system and a method for matching buyers and sellers through a remote terminal interacting over a telephone line with a host computer, wherein the system offers: readily available online access to a database containing several property listings; online search capabilities permitting a prospective buyer to select a group of properties based on a set of criteria; listings of properties according to an identification number known only to the system's operator, thereby preserving seller anonymity; qualification of buyers based on information supplied by the buyer; and a means of transmitting information about an interested buyer to a seller.

These objects and others are achieved through a method and apparatus of automatically matching sellers of property with potential buyers through a communications network in which a host system communicates with the sellers and the potential buyers over telephone or dedicated data transmission lines. The host system obtains and stores a first set of records each corresponding to a property to be sold. The first set of records can then be search by a remote data terminal associated with a potential buyer. The results of this search are then provided to the potential buyer, who indicates specific property listings that the potential buyer may be interested in purchasing. The potential buyer provides identifying information which is then provided to the sellers of the indicated property.

According to one aspect of the invention, the buyer's information is evaluated by the host system to determine whether the buyer is qualified to purchase each selected property.

According to another aspect of the invention, the host system maintains a set of records associated with the sellers of the properties listed on the system. Preferably, these sellers records are unavailable to potential buyers accessing the host system.

According to still another aspect of the invention, the host system maintains information associated with the seller records which indicate seller account status, thereby permitting the host system to verify whether to provide buyer information to the sellers using the system.

According to yet another aspect of the invention, the host system automatically provides buyer information to each seller of the property listed on the system by data transfer through the network.

According to another aspect of the invention, the host system and said plurality of remote data terminals exchange data through the Internet.

BRIEF DESCRIPTION OF THE DRAWINGS

In the drawings:

FIGS. 4A to 4C are respective illustrations of a seller record, a buyer record, and a property item record as used in an embodiment of the invention.

DETAILED DESCRIPTION OF THE PREFERRED EMBODIMENTS

Figure 1:
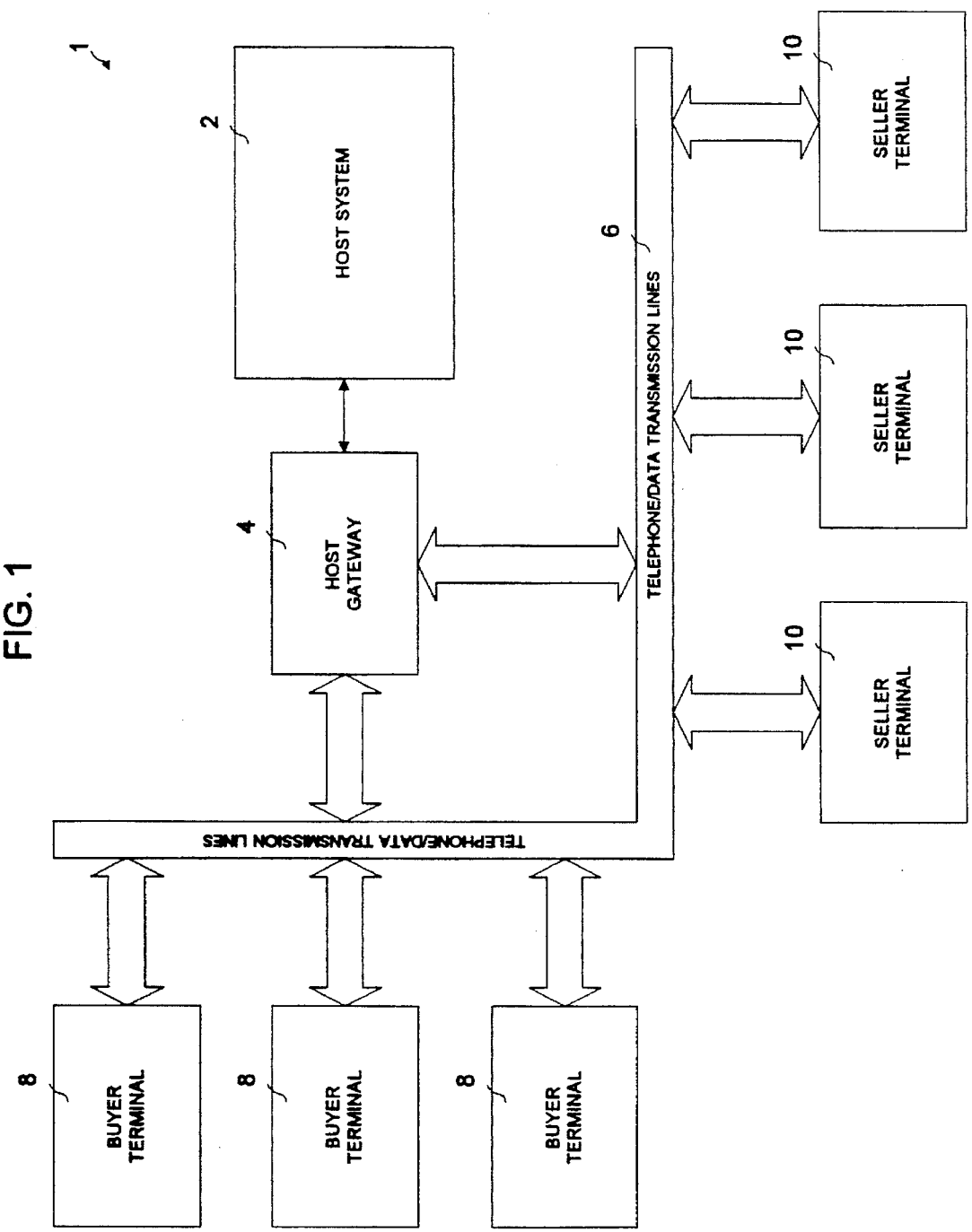
FIG. 1 is a block diagram of a system according to the invention.

In the drawings, FIG. 1 is a block diagram of the primary elements of a system 1 according to the invention. In this system 1 a host system 2 exchanges data with a plurality of remote terminals 8, 10 through data transmission across telephone and data transmission lines 6. Data transmission on the host end utilizes a host gateway 4 which interfaces the host system 2 to the network with a protocol understood by the remote terminals 8, 10 (or intermediary equipment connected thereto). For example, on the Internet, transmission control protocol/internet protocol (TCP/IP) typically is used.

In this example, three "buyer terminals" 8 and three "seller terminals" 10 are illustrated. These numbers are only by way of example. In actual implementation, it is intended that the system according to the invention utilize a network, such as the Internet, having thousands of users who can access the system.

In accordance with the preferred embodiment, the host system 2 is operatively connected to the Internet. In this example, the host system 2 has at least a first "home page" remotely accessible to a prospective buyer. This home page permits the prospective buyer to view listed properties item-by-item or to search all listed properties in the manner described above. According to another feature of the invention, the host system 2 utilizes a second "home page" intended for access by sellers or seller's agents in the manner described below. Of course, it will be understood by those skilled in the art that a single home page can be used to provide access to the system by both buyers and sellers.

With the system according to the invention, prospective buyers and/or sellers can gain access over telephone and data transmission lines to the host system by contacting the host gateway. As is known in the art, this contact can be established on a network such as the Internet by sending data packets to an electronic address associated with the host system.

Figure 2:
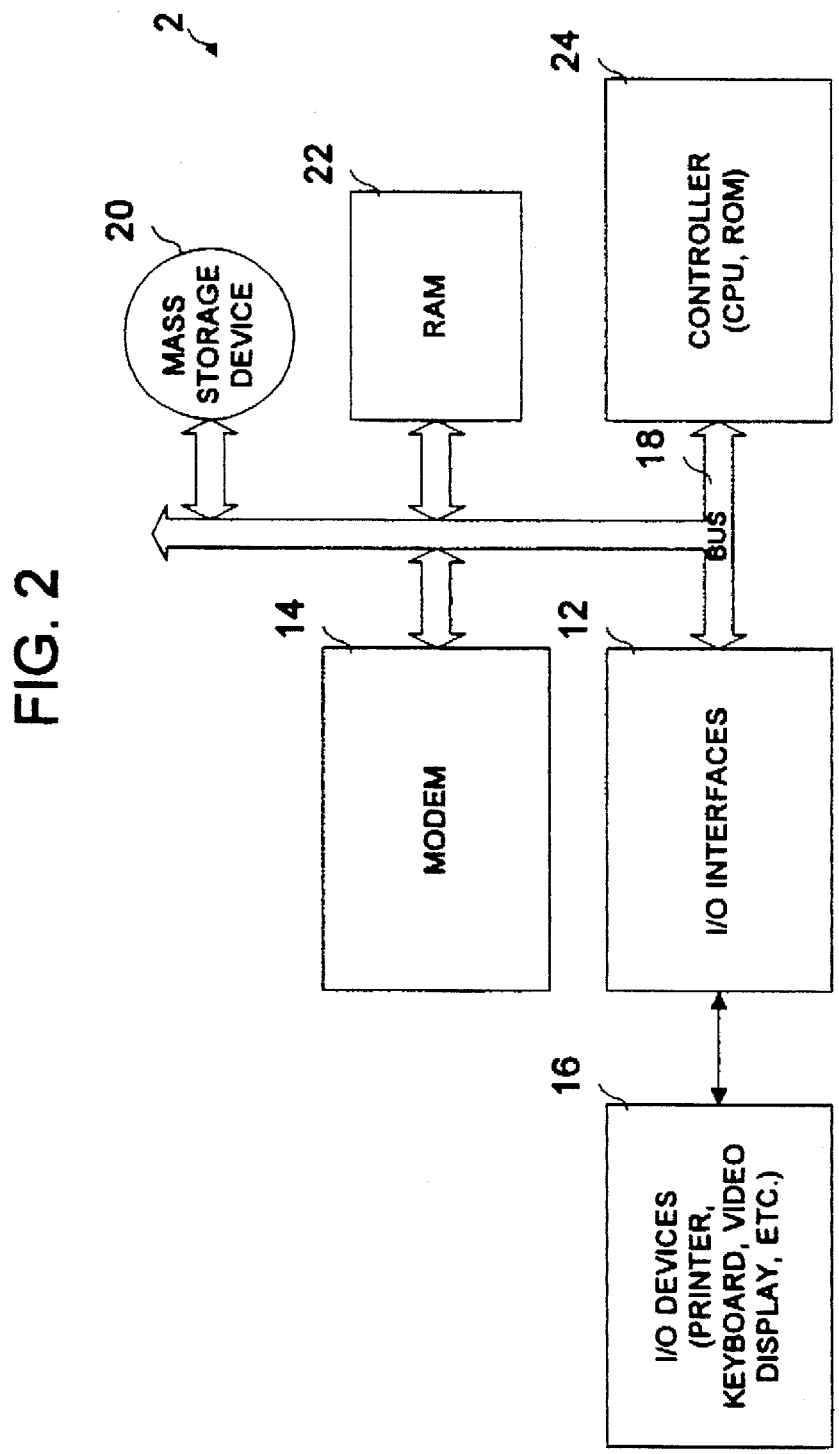
FIG. 2 is a block diagram of a host system according to the invention.

FIG. 2 is a block diagram illustrating in more detail the host system 2 of FIG. 1. As shown, a controller 24 comprising a central processing unit (CPU) and associated read only memory is connected along data and address bus lines 18 to a random access memory (RAM) 22. Also connected to the RAM 22 and the controller 24 is at least one mass storage device 20. These components are operatively connected to input/output interface devices 12 which control various corresponding input/output devices 16. These I/O devices 16 include such conventional elements as a video display, a keyboard, a printer, and other input devices such as a mouse and a digitizer or scanner.

According to a preferred embodiment, the system includes a modem 14 which is utilized to exchange information with remote terminals over standard voice lines. Of course, it will be understood that other devices can be utilized transfer data between the host system and the various remote users of the system.

As is conventionally known in the art, the ROM provides software instructions to perform basic operations upon power up of the system. Once the system receives these instructions, the CPU reads operating system instructions stored on disk to configure the system and to permit execution of various applications programs. These applications programs permit the functions described below.

Figure 3:
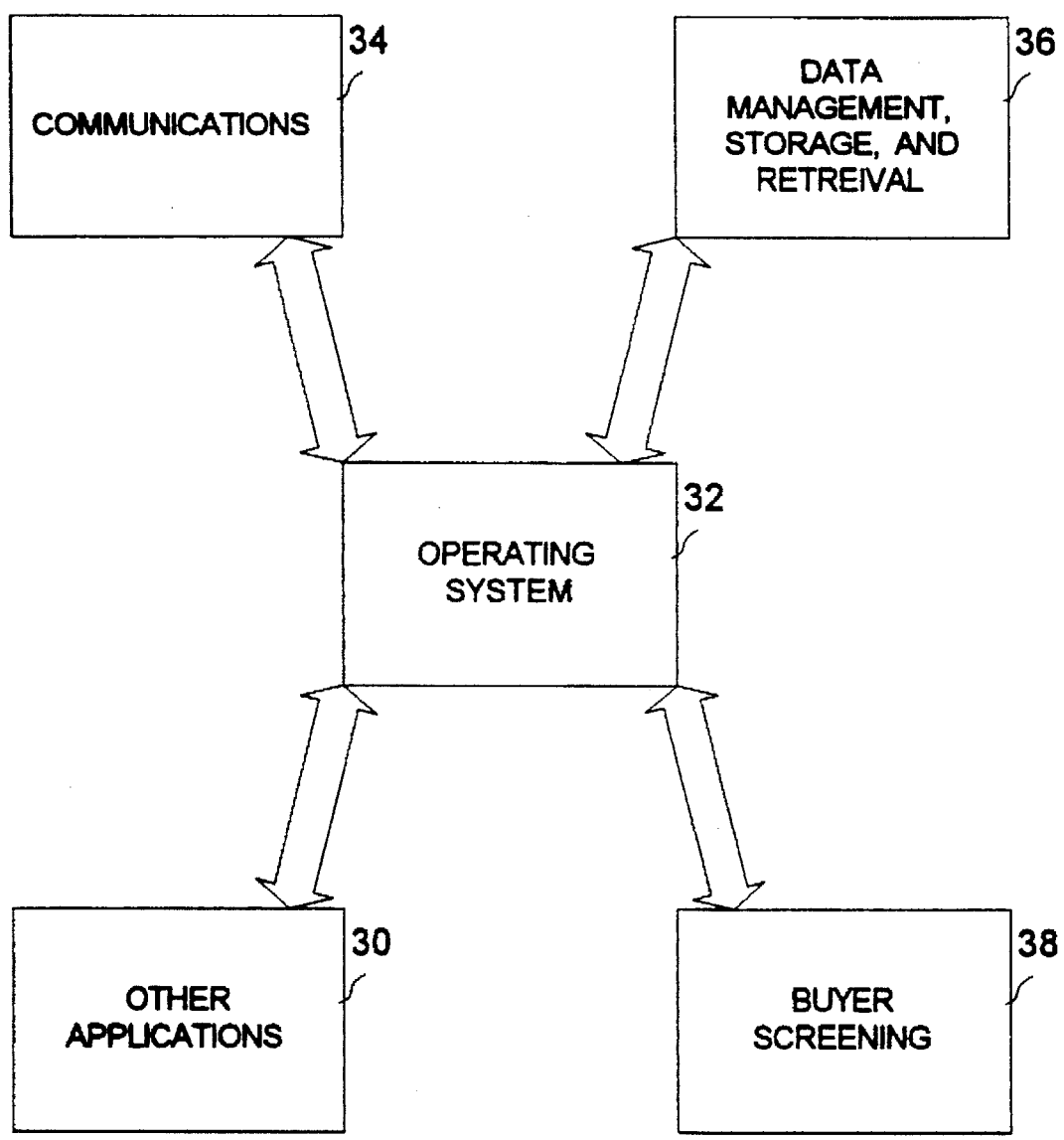
FIG. 3 is a block diagram of the software environment for one embodiment of the present invention.

FIG. 3 generally illustrates the software configuration of the host system 2. As shown, the system operates under control of a conventional operating system 32. The operating system 32 permits various application processes to be executed. These include a communications application 34 which permits data transfer with various remote terminals, such as those referred to above. The communications application 34 permits prospective buyers at the remote terminals to log onto the host system, implement searches and provide identifying information about themselves in the manner discussed below. According to one embodiment of the invention, the communications application 34 also permits seller interaction with the system, for example, to obtain information regarding prospective buyers and to post information regarding various pieces of property to be sold.

The software environment further includes a data management, storage, and retrieval application 36, that is, a database application. The data management, storage, and retrieval application 36 organizes the information exchanged with prospective buyers and that provided from sellers. This information is organized and stored within the environment of the operating system 32 on one or more mass storage devices, such as the one referred to in FIG. 2. An example of the manner by which the data corresponding to this information is organized and stored is described below in reference to FIGS. 4A to 4C.

Also included in the software environment is a buyer evaluation application 38 which screens potential buyer's on behalf of the seller. Specifically, this application evaluates the likelihood that a particular buyer can or will purchase a particular property item on the basis of information regarding the item and information obtained from the prospective buyer.

Other applications 30 conventionally known may be included in the software environment.

FIGS. 4A to 4C illustrates an example of three types of records created by the data management, storage and retrieval process according to the invention. In FIG. 4A, a seller record is illustrated. Each seller record comprises several fields. By way of example, six fields are illustrated comprising a seller identification number, the seller's name, the seller's address, the seller's telephone number, listed property items, and access status. It should be understood that in implementation, several more fields are utilized, for example, in order to break down address information into street, city, state, and so forth.

FIG. 4B illustrates a buyer record. Again, merely by way of example, only six fields are shown comprising buyer identification number, buyer name, buyer address, buyer telephone number, qualification information, and requested property items. It should be understood that several of these items, particularly qualification information are preferably broken down into several individual fields.

FIG. 4C illustrates a property record. In this example, the property record includes at least the following fields: property identification number, type of property, cost, associated seller number, and any requesting buyers. Several other fields are also included to describe the property, for example, location, size, sales volume, and so forth.

Figure 5A:
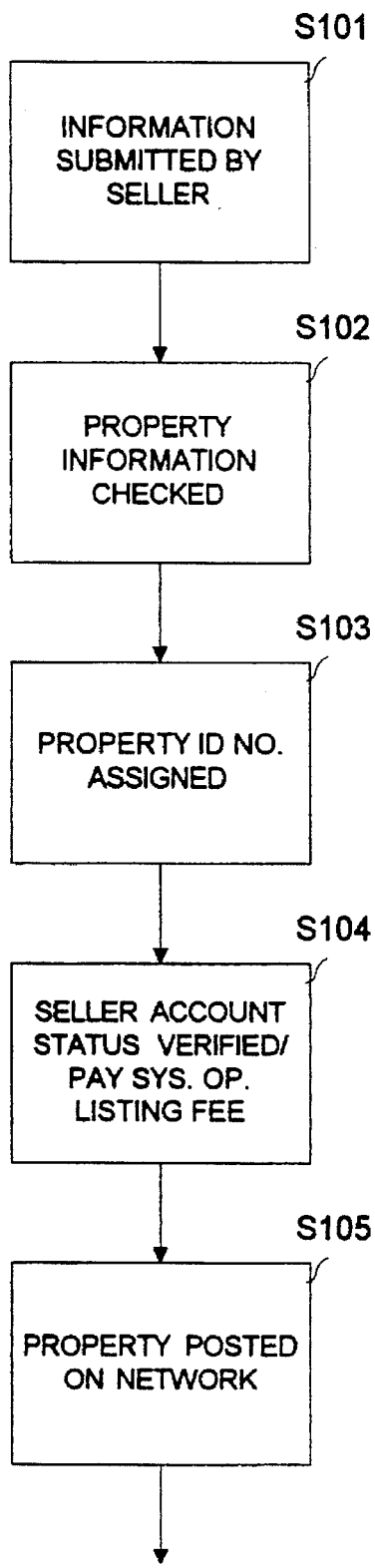
FIGS. 5A and 5B comprise a top-level flow chart describing the present invention.
Figure 5B:
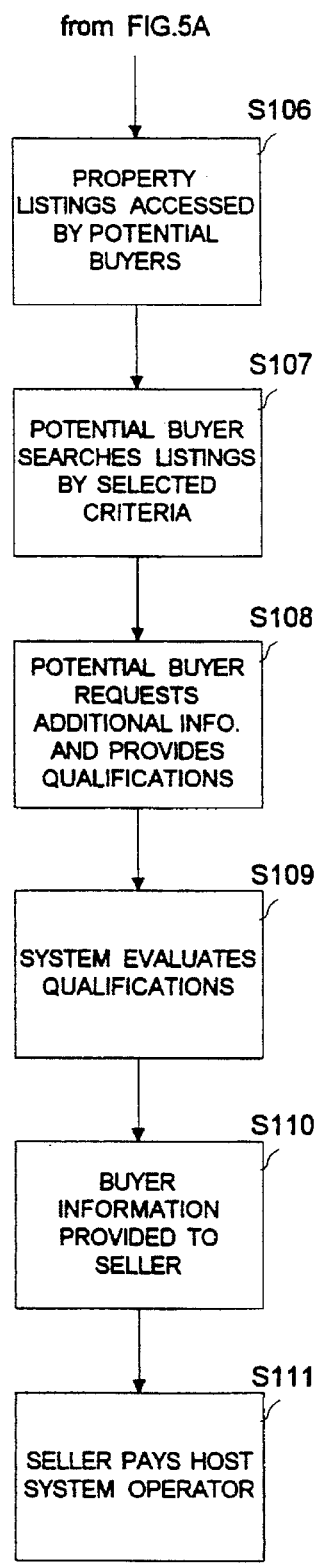

The general operation of the system is described with reference to the flow chart shown in FIGS. 5A and 5B. As shown, information pertaining to a particular piece of property to be sold, such as a business, is submitted by a broker or a seller at S101. This information can be submitted by telephone, facsimile or mail to the host system operator. Alternatively, this information can be provided by electronic mail in the Internet environment and automatically posted to the system if certain conditions are met.

Once information is received by the host system, it is checked at S102 for completeness and compliance with the listing format. Once checked, each listing is formatted for listing on, for example, the World Wide Web. Additionally, an identification number is assigned to each listing at S103. These numbers are cross-referenced to a particular seller's information (such as that shown in FIG. 4A) which is also stored in the system, but which is not accessible to remote users.

Prior to posting the listing on the host system for access to prospective buyers, the seller's account is checked at S104 to ensure that the seller is in good standing with the host system. This permits, for example, the host system operator to ensure that an appropriate fee agreement with the seller has been properly signed and that the seller is in compliance with any such agreement. Such an agreement might provide that the seller pay a nominal fee for each listing sufficient to cover system operating expenses and to pay a second fee if and when a sale is ultimately consummated.

Once the seller's account information is verified and each listing is properly formatted and identified, it is listed on the system at S105 via the network to which the host system is connected. As mentioned above, it is preferable that the property listings be accessed through the World Wide Web. Of course, through conventional techniques, the data associated with each property listing that is available to remote terminals may include graphical information, such as an image of the item being offered for sale.

The several listings provided by the host system may be accessed by remote users (potential buyers) at S106 through the network to which the host system is connected. For example, prospective buyers could find out about the system through newspaper or magazine advertisements. The prospective buyers can then access the system through a direct Internet provider or through various commercial online services.

Once a prospective buyer enters the system, he or she accesses information regarding each item by searching page by page through the item listing. In accordance with the invention, the buyer can instead input a sorting criteria to select only preferred ones of the property listings (S107). For example, if searching for particular businesses being offered for sale, the prospective buyer specifies particular locations, ranges of sales volumes or SIC codes.

Once prospective buyer's criteria is received, the host system executes a search of all listings in accordance with the input criteria. The prospective buyer then reviews each property listing meeting his or her criteria to determine whether to request more information from the seller. If such a request is made (S108), the system then requests information about the prospective buyer, such as name, address, telephone number, available cash, or business experience, as well as the identification numbers of each property listing for which additional information is requested.

Once this information is obtained from the prospective buyer, the system executes an evaluation program at S109 which determines whether the prospective buyer matches minimum criteria for purchasing each property item selected by the prospective buyer. This evaluation is preferably a rather simple process involving, for example, determining if the potential buyer has a sufficient net worth or available cash to meet minimum purchasing requirements provided by the seller.

The results of this evaluation is then recorded along with the other information provided by the prospective buyer and passed along directly to the seller (S110). For example, host system matches the identification number of each property with the address of the seller and provides the buyer information to the seller. Preferably, the buyer information is transferred to the seller of the matching property then automatically by the system. Alternatively, a print-out can be provided periodically to enable the host-system operation to contact the sellers by telephone, facsimile, mail or other means.

Upon receiving the prospective buyer's requests, the brokers or sellers determine which buyer to respond to based on the information provided by the prospective buyer. If a transaction is ultimately consummated, the seller then pays the system operator an appropriate fee in accordance with the aforementioned agreement (in addition to the aforementioned listing fee), thereby maintaining the seller's account in good standing (S111).

Figure 6A:
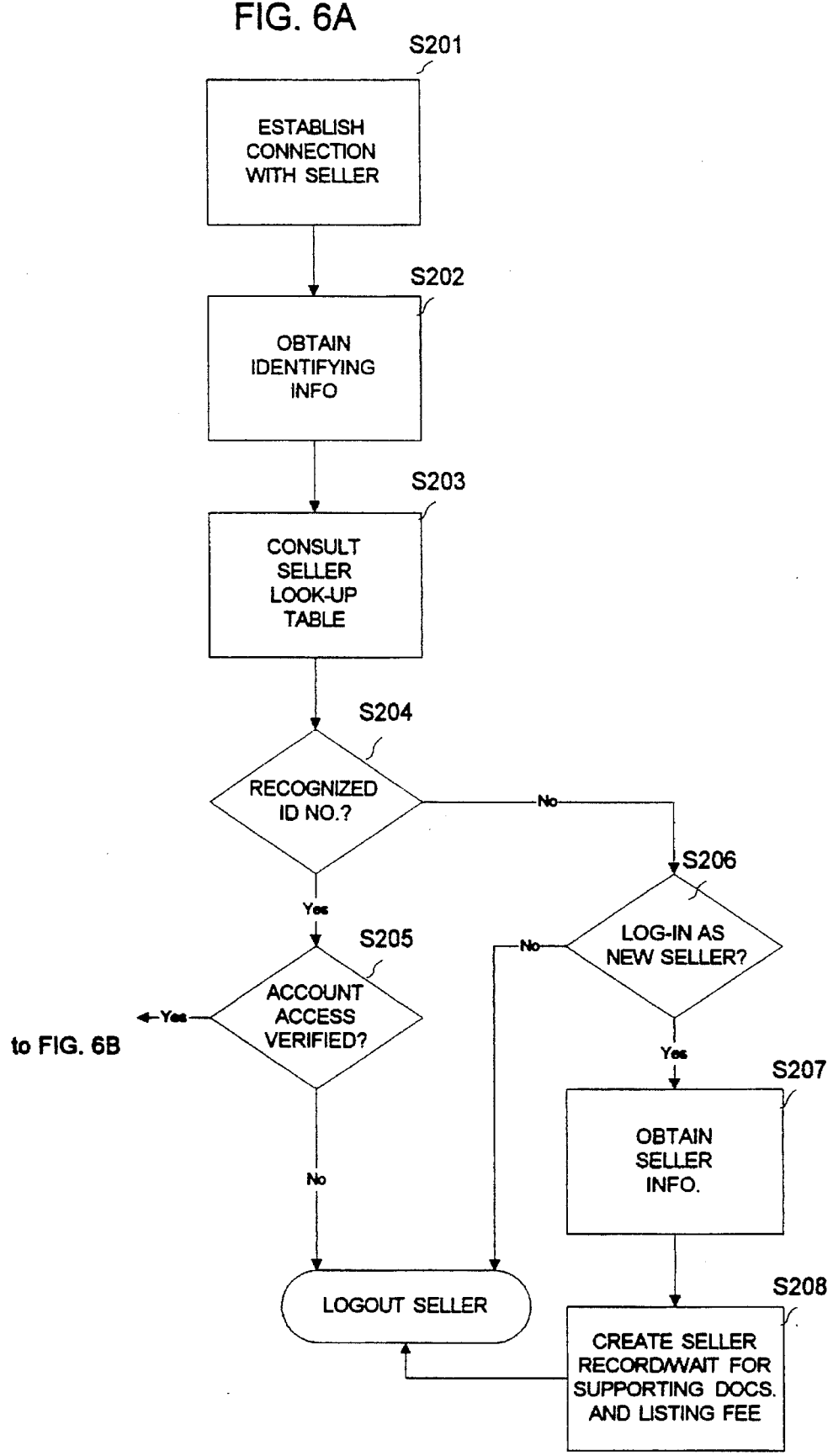
FIGS. 6A and 6B comprise a flow chart describing online communication and data transfer between a host system and a remote seller.
Figure 6B:
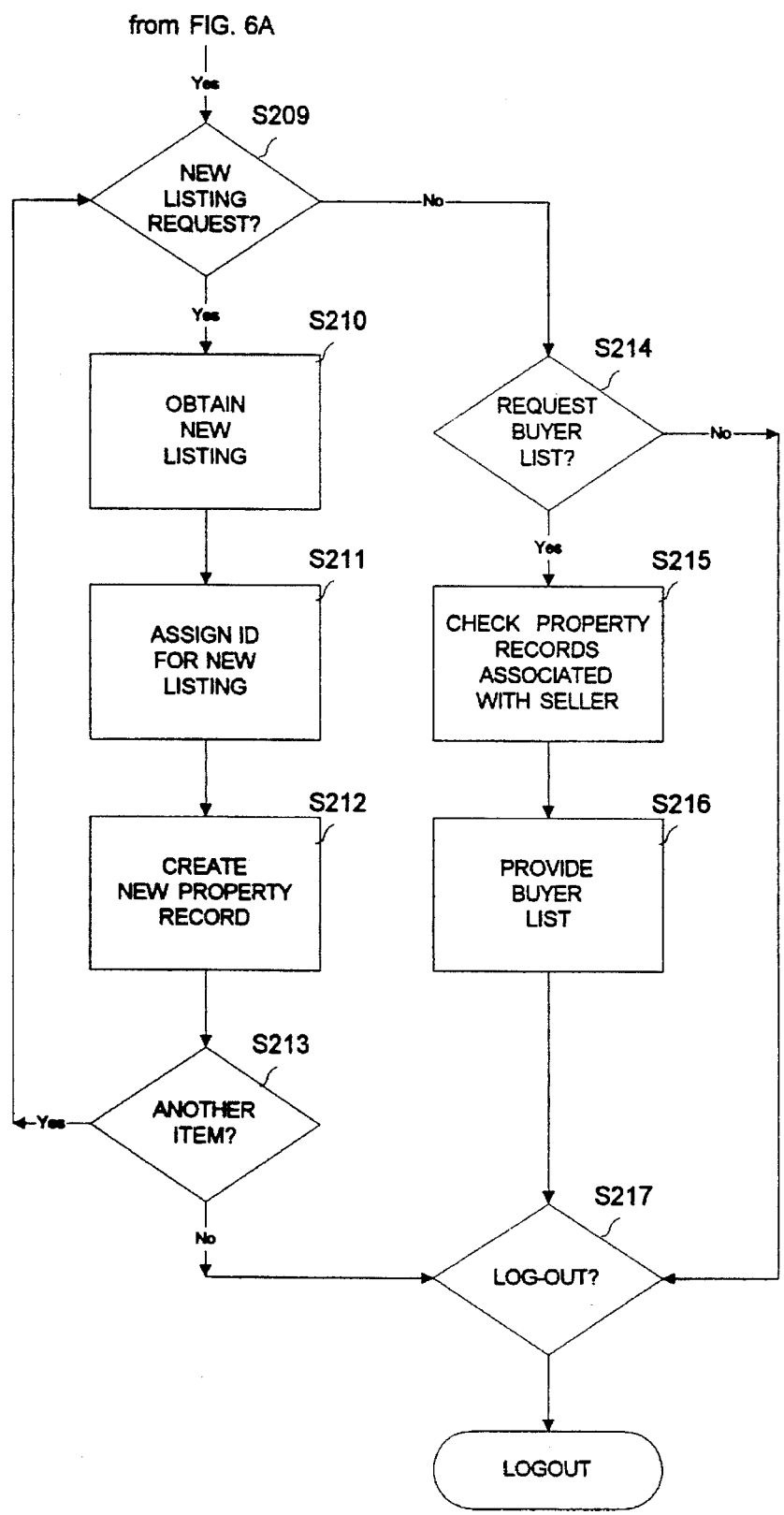

FIGS. 6A and 6B together comprise a flow chart illustrating a method by which information can be automatically received by the host system from a seller wishing to list a particular property to potential buyers. First, at S201 a connection is established on the network with a seller through the communications application referred to above. The seller logs in S202 by providing identifying information such as a password, name, or other information. At S203 the system then consults a look up table stored in memory or on disk to determine whether the seller is a previous user and to obtain the seller's identification number. Specifically, the host system maintains a record of each seller that logs into the system. These seller records contain identification information, including, for example, a password, the seller's name, address, telephone number, and a unique seller identification number assigned by the system. Each record further includes a field indicative of whether the seller is approved for access to the system.

If after consulting the look-up table maintained by the system it is determined at S204 that the seller does not have a recognized identification number, the seller is prompted at S206 to state whether the seller wishes to list properties for sale on the system. If so, at S207 the system obtains the information necessary to create a seller's record (that is, the seller's name, address, telephone number) assigns the seller a unique identification number, and then creates a new seller record at S208 based on the information obtained.

At the time a new seller's record is created, it is noted that the seller's account is not yet approved for access. The system operator subsequently mails the appropriate agreement forms and listing fee invoices to the sellers who have newly contacted the system. Once payments for the listing fees and the appropriate signed agreement forms are returned, the system operator updates each seller's record to approve their access to the system. In the meantime, after the appropriate information is obtained from a new seller, or in the event a new seller is not inclined to provide such information, the seller is logged out.

If the seller is recognized by the host system, the seller's record is consulted at S205 to determine the status of the seller's account. If the account status is disapproved, for example, because no signed agreement has yet been received or because the agreement has been breached by the seller, the seller is logged out. On the other hand, if the seller's account is in good standing, the seller is asked if the seller wishes to post a new listing on the system at S209.

If the seller so desires, the system receives the information pertaining to each property listing at S210, and then assigns a unique identification number for each listing at S211. Although not shown, this information is confirmed by the seller and the identification number provided thereto. A new property listing is then created at S212 which can either be immediately added to the entire property listings, or preferably is first reviewed by the system operators prior to being made available to prospective buyers.

Once a new property listing has been recorded, the seller is then asked at S213 if the seller wishes to post another listing. If so, the process for the host system to obtain a property listing is repeated.

According to this embodiment of the invention, once all requested property listings have been received (or if none are requested), the seller is asked at S214 whether the seller wishes to receive a list of buyers who have requested further information regarding a property currently being listed on behalf of the seller. If so, the property record(s) associated with the seller is (are) checked to determine whether any buyers have requested additional information (S215). If any such property records indicate that requests have been made, the information received from the requesting buyer is downloaded to the seller at S216.

Once all appropriate buyer records are provided to the seller, the seller is asked at S217 whether the seller wishes to log out. If not, the new listing prompt is re-initiated. Otherwise, the session is terminated.

Figure 7:
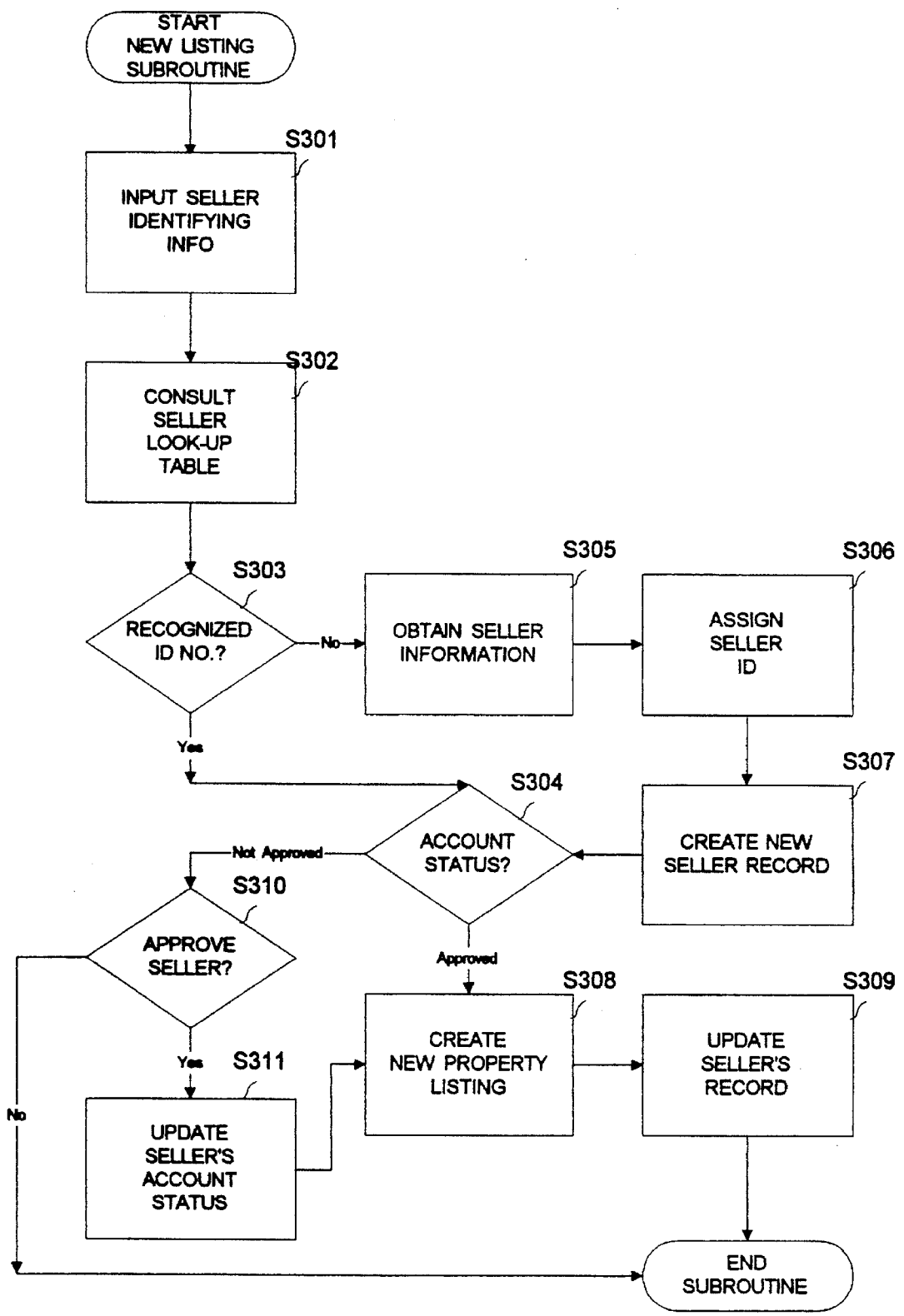
FIG. 7 is a flow chart describing a method by which seller records and property item records are input and updated according to one embodiment of the present invention.

As mentioned above, the preferred system according to the invention is not limited to providing access to sellers only through the network to which the host is coupled. Instead, sellers can provide new listings by facsimile, telephone, or other means. FIG. 7 is a flow chart describing the process by which such information is provided to the system.

As shown, the system operator initiates a new listing subroutine with the host system. At S301 the system operator inputs information identifying a particular seller, such as name, address, or previously assigned seller identification number. Based on this information, the system consults a look-up table to verify the seller's identity at S302. If at S303 a previous identification number is found, the process continues at S304. If no identification number is found, the system obtains the seller's information from the system operator at S305, assigns a unique seller identification number at S306 and records the information in a new seller record at S307. Since the seller record is new, the account status is automatically set to "not approved."

The system then checks the seller's record to determine the seller's account standing (S304). If approved, at S308 the system operator inputs a new property listing, a unique property identification number is created, and a new property listing is recorded which is approved for posting on the system so that it can be viewed by potential buyers. The seller's record is then updated to reflect the new property listing at S309.

If the seller's account is not in good standing, for example, because it has just been created, the system operator is asked at S310 whether to change the status of the seller's record to approve the seller's account. This provides the operator with a chance to ensure that any agreement with the seller is in order. If approved, the seller's record is updated at S111 to indicate that it is in good standing and the subroutine resumes at step S308. Otherwise the subroutine is terminated.

Figure 8A:
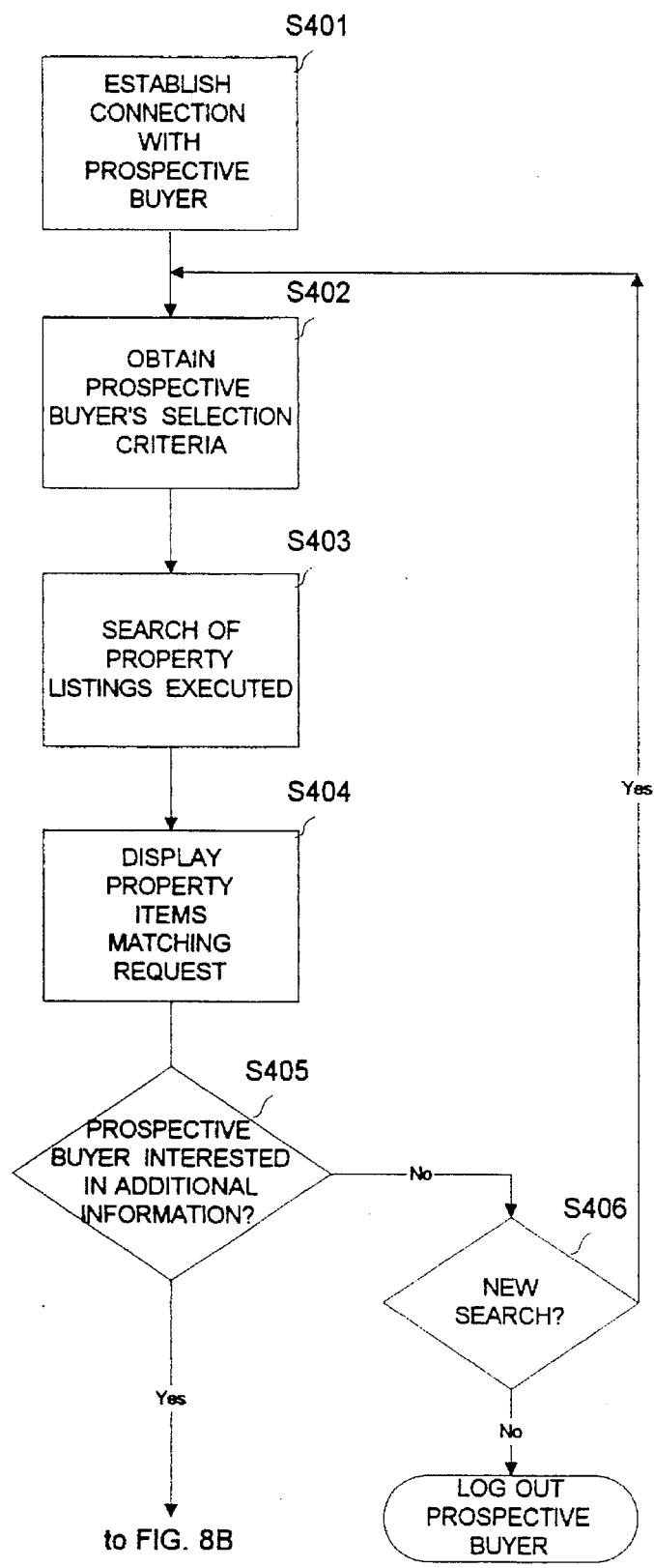
FIGS. 8A and 8B comprise a flow chart illustrating on line communication and data transfer between a host system and a remote buyer.
Figure 8B:
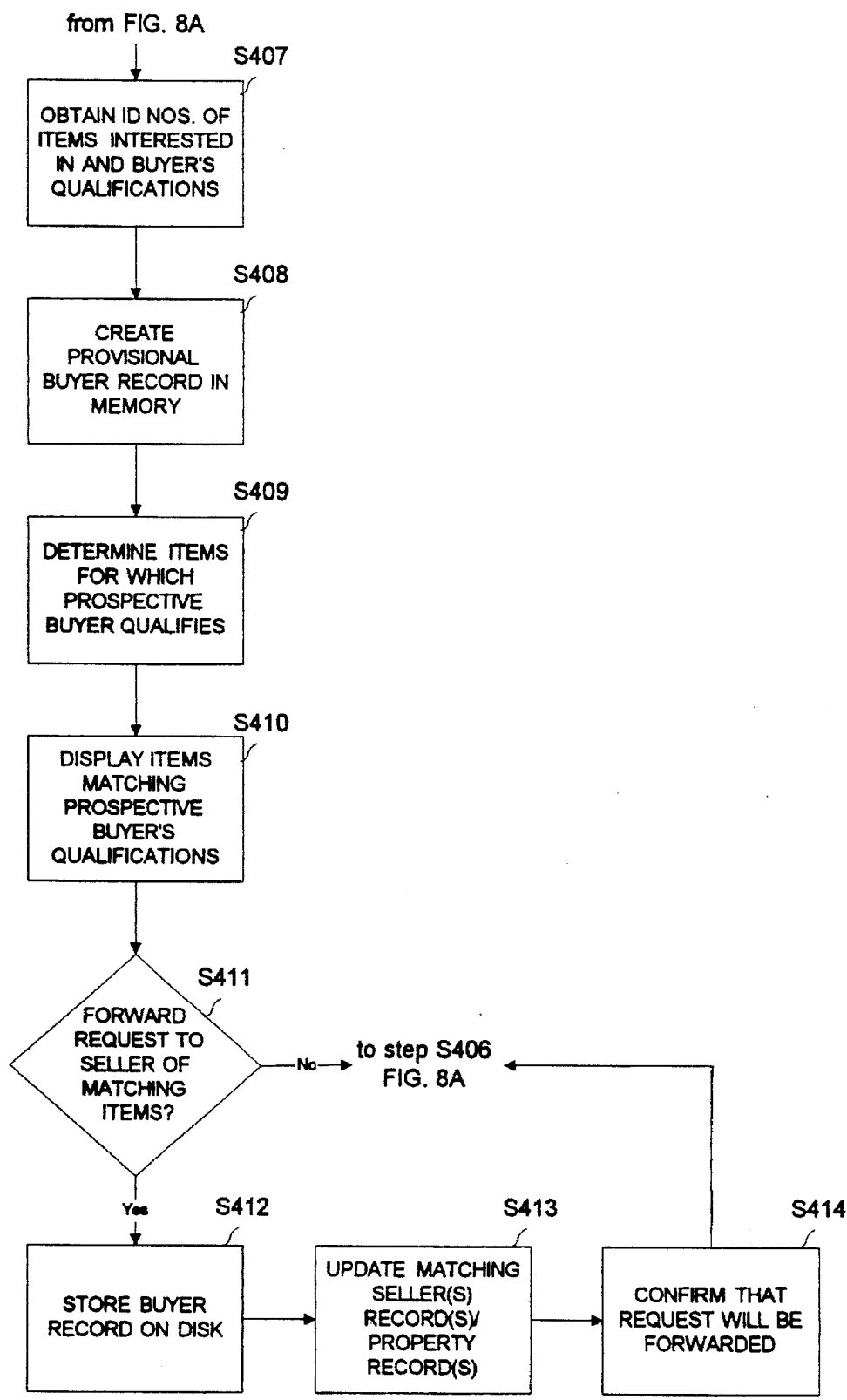

FIGS. 8A and 8B together comprise a flow chart describing the pertinent aspects of the host system's interaction with prospective buyers. Although not shown, it is contemplated that the system permits an item-by-item search of listed properties. However, in accordance with the invention, the drawings illustrate the manner by which a buyer can select particular properties in accordance with particular criteria which are then evaluated to determine the buyer's qualifications and/or likelihood to purchase selected ones of the property listings meeting such criteria.

As shown, at S401 a connection is established with the prospective buyer. Next, at S402 the buyer inputs the buyer's selection criteria. This criteria may include, the property type (that is, real estate, business, personal property) location, expense, and so forth. Once the criteria has been entered, at S403 the system executes a search of all property records, and then displays the search results at S404. The prospective buyer is then asked at S405 to indicate whether additional information concerning the property items found by the search is desired. If not, the buyer is given the option at S406 of performing additional searches or can then log out.

If the prospective buyer requests additional information, the buyer is asked at S407 to input identifying information, the identification numbers of the properties which the buyer is interested in, and specific information pertaining to the buyer's qualifications. Once this information is received and confirmed by the buyer, a provisional buyer record is created and stored in memory at S408.

After a provisional buyer record has been created, the aforementioned evaluation process is executed at S409 to determine whether the buyer meets the seller's minimum qualification standards for each selected property. The results of this evaluation are then displayed to the prospective buyer at S410, who is then asked at S411 if it is desired to forward the buyer's information to the seller of the matching items. If not, the prospective buyer is asked whether a new search is desired at S406. On the other hand, if the prospective buyer wishes to contact the seller, the buyer's provisional record is stored on disk at S412 and the appropriate matching seller and property listing records are updated at S413 to reference the buyer's record. The host system then provides a confirmation to the buyer that the buyer's information will be forwarded to the appropriate seller (S414), and the buyer is given the option to perform a new search.

Figure 9:
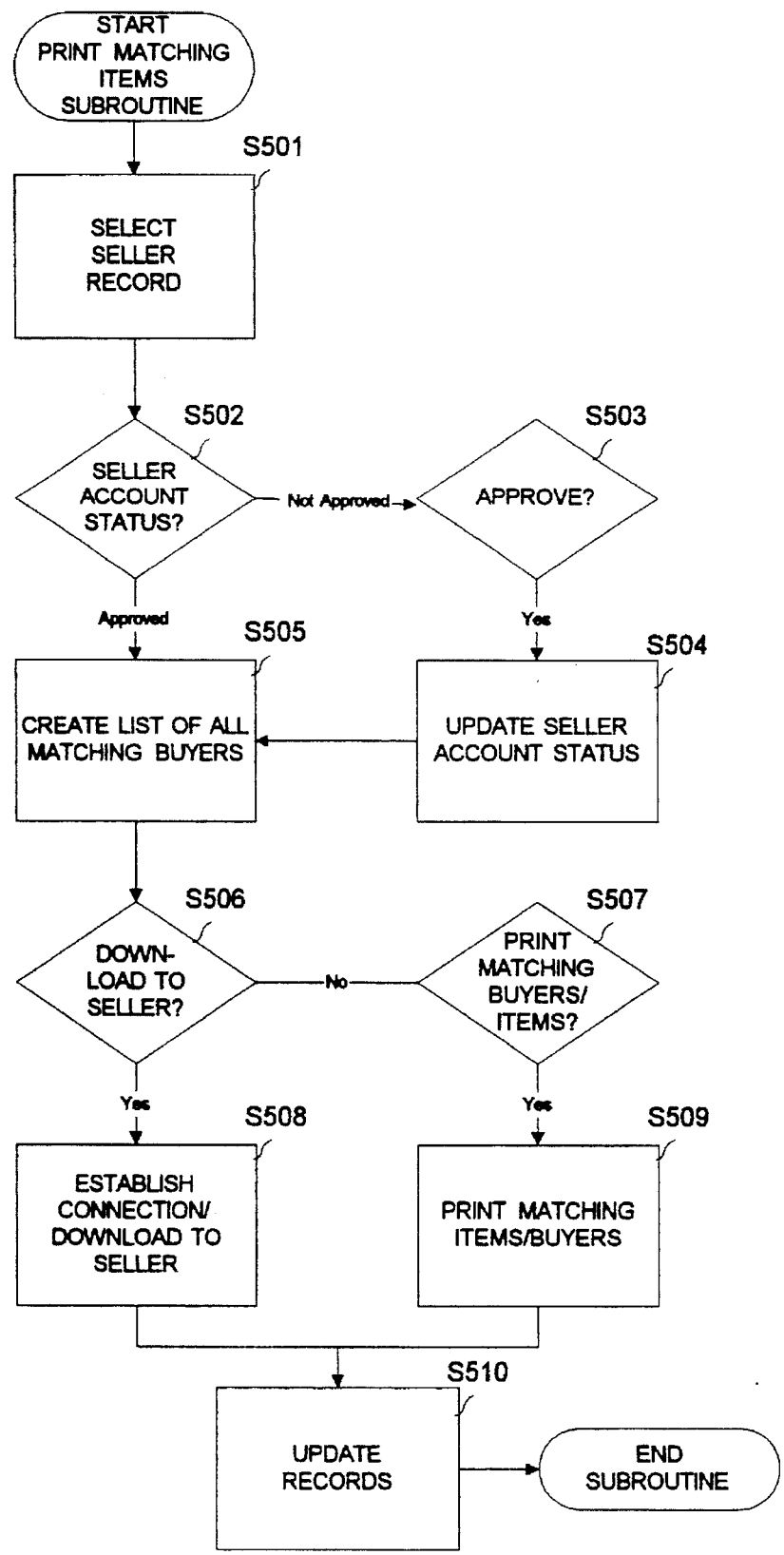
FIG. 9 is a flow chart describing one embodiment by which matched listings of property items and buyers are transferred to a seller.

FIG. 9 describes a process by which the host system can periodically provide information obtained from qualified buyers to approved sellers. As shown, a particular seller's record is accessed at S501. Next, the seller's account status is verified at S502. If approved, the process continues. If not, the system operator is given the option at S507 of changing the status of the seller's record at S504, or of terminating the subroutine.

Once an approved seller's record is accessed, the system consults the seller's record and/or all associated property listings to create a list in memory of all qualified buyers which have previously requested further information pertaining to a matching property listing (S505). This list includes the information provided by the buyer which is recorded by the system in the buyer's record.

The system operator is then given the option at S506 and S507 of either downloading the list to the seller via a network connection (S508) or printing a list of matching property items and sellers (S509). In the latter case, the list can be conveyed to the seller by telephone, facsimile or other appropriate means. The records are then updated at S510 to reflect that information is being provided to the seller(s).

It should be apparent that the preferred system and method according to advantages provides several advantages. For example, it permits buyers with ready access to many types of property listings. In particular, it is contemplated that the prospective buyer be given free access, and to only be asked for identifying information should he or she desire more information about particular listings. It also permits the buyer to rapidly weed out any property listings not matching a preferred set of criteria.

Further, the system provides an extremely rapid and easy method to evaluate a prospective buyer's qualifications. This serves both the buyer and the seller by reducing the chances that time will be wasted making contact where the buyer is unable or unwilling to purchase a particular property.

The system according to the invention also provides a means to match buyers and sellers while preserving the anonymity of the seller to as great a degree as possible. In this way, the system provides the role of a seller's broker. However, by serving the buyer's interests with the virtually cost-free searching functions, the system operates in a much less intrusive, and much more efficient manner. This increases the likelihood that buyer interest will be maintained, and that a transaction will ultimately go through.

It will be appreciated by those skilled in the art that many alternate embodiments of the invention are possible. For example, each seller could be given the option of indicating that no screening evaluation be performed. Optionally, each seller may additionally indicate the type of criteria by which the evaluation should be performed. For example, a seller may indicate for each listed a minimum net worth or available cash of a prospective buyer. The system would then consult each property record in order to perform a custom evaluation in accordance with criteria indicated by the seller. Many other variations will be apparent to the skilled artisan without departing from the spirit and scope of the invention. Accordingly, it is intended that the invention only be limited by the claims appended hereto.

What is claimed is:

1. A system for selectively displaying property listings to potential buyers and for obtaining buyer profile information associated with said potential buyers which is provided to sellers of property described in said property listings, comprising:

a host system;

a plurality of remote data terminals;

data transmission means providing a signal path for data exchange between said host system and said plurality of data terminals;

data storage means within said host system, said data storage means maintaining a plurality of data records of different types, including: property records, buyer records, and seller records;

processing means within said host system including a central processing unit and associated memory means; and communications means associated with said host system, said communications means being controlled by said processing means to provide and receive data transmissions between said host system and said remote terminals;

wherein said processing means selectively retrieves said property records in accordance with sorting criteria provided by one of said plurality of remote terminals, and provides information contained in said property records to said remote terminals;

wherein upon request by a user of one of said plurality of remote terminals, said processing means obtains buyer profile information corresponding to the user, the buyer profile information including buyer qualification information;

wherein the processing means compares said buyer qualification information with a threshold values stored within a retrieved property record, and, when the buyer qualification information exceeds the threshold value determined by the information stored within the property record said processing means creates a buyer record based on said buyer profile information that indicates which of said property records were requested by the user who provides said buyer profile information, said host system selectively providing said buyer record to each seller of the property listed in said property records using information stored in said seller records;

wherein said seller records includes seller identification information and seller account status information, the seller account status information determining whether said second data records are accessible to a seller.

2. The system according to claim 1 wherein said information contained in said seller records is unavailable to potential buyers through said system.

3. The system according to claim 1 wherein said host system provides said buyer record to each seller of the property listed in said first data record through data transmission with said communications means.

4. The system according to claim 1 wherein said host system and said plurality of remote data terminals exchange data through the Internet.

5. A method of automatically matching sellers of property with potential buyers through a communications network, comprising:

obtaining a set of property records each corresponding to a property to be sold;

storing said property records on a data storage means associated with a host system, said host system comprising a processor with associated memory and at least one input/output device;

establishing data communication with said input/output device over telephone or data transmission lines provided between said host system and a plurality of remote data terminals each associated with a potential buyer;

searching said property records based on selection criteria provided by a potential buyer;

providing results of said step of searching to said potential buyer through a corresponding data terminal;

obtaining buyer information from said corresponding data terminal which describes said buyer, said buyer information including buyer qualification information;

comparing said buyer qualification information with a threshold value stored within a retrieved property record;

when the buyer qualification information exceeds the threshold value, creating a buyer record that includes said buyer information and properties selected by said buyer;

selectively providing said buyer record to sellers of properties selected by said buyer, wherein the buyer records are provided to sellers on the basis of seller account status information stored in seller records associated with each seller.

6. A method according to claim 5, wherein information contained in said seller records is unavailable to said potential buyers through said host system.

7. A method according to claim 5 wherein said host system provides said buyer profile information to each seller of the property listed in said property records through data transmission with said input/output device.

8. A method according to claim 5 wherein said host system and said plurality of remote data terminals exchange data through the Internet.

* * * * *